Sept. 20, 1932.  D. TAPPAN  1,877,778
COMPRESSED AIR DUSTER
Filed Dec. 11, 1930  2 Sheets-Sheet 1
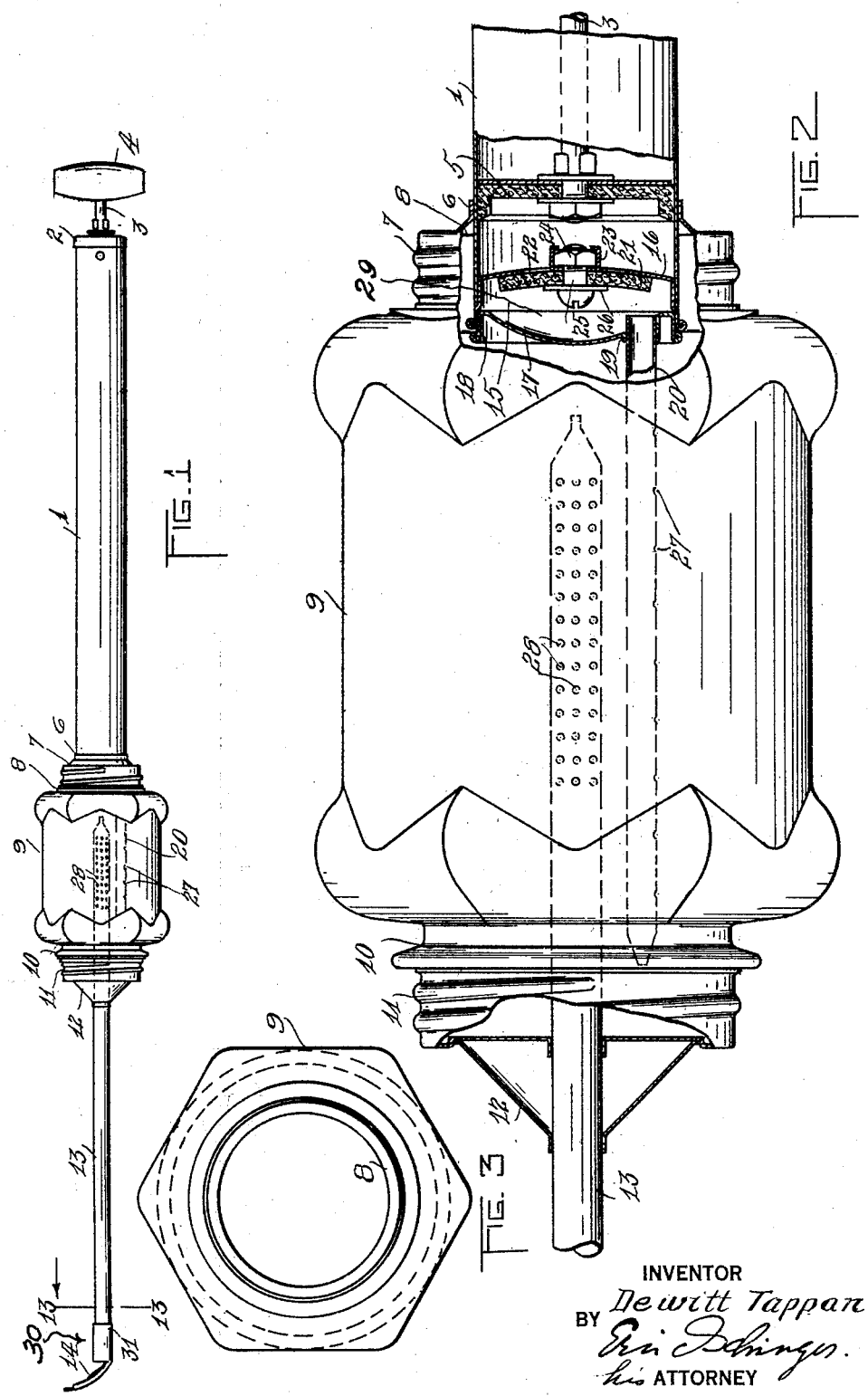
INVENTOR
Dewitt Tappan
BY
his ATTORNEY Sept. 20, 1932.  D. TAPPAN  1,877,778

COMPRESSED AIR DUSTER

Filed Dec. 11, 1930   2 Sheets-Sheet 2

INVENTOR
Dewitt Tappan
BY
his ATTORNEY

Patented Sept. 20, 1932

1,877,778

UNITED STATES PATENT OFFICE

DEWITT TAPPAN, OF ROCHESTER, NEW YORK, ASSIGNOR TO E. C. BROWN COMPANY, OF ROCHESTER, NEW YORK

COMPRESSED AIR DUSTER

Application filed December 11, 1930. Serial No. 501,615.

The present invention relates to manually operable compressed air dusters of the type used in spraying field and truck crops, an object thereof being to provide a duster in which the pump cylinder, dust container and discharge tube are in axial alignment.

Another object of the invention is the provision of a container which is open at both ends.

Another and more specific object of the invention is the provision of a glass container having a true cylindrical interior surface and with polygonal portions on its exterior surface, the purpose of the latter, other than for reinforcement, being to keep the cylinder right-side-up and prevent it from rolling, when placed upon a support, the polygonal portions being so arranged as not to destroy vision through the main body portion of the container.

A further object of the invention is the provision of a new and novel method of agitating the dust in the container which includes means for directing a plurality of air streams into the dust.

A further object of the invention is to employ a compressed air chamber at the inner end of the pump cylinder as a part of the agitating means and to so form this chamber as to permit ready access to a valve seated therein.

And, a still further object of the invention is to provide a duster of the character described which is simple and strong in construction, inexpensive to manufacture, easy to clean and refill, effective in operation and which is conveniently handled.

To these ends the invention consists of a duster as will be fully set forth in the following description and particularly defined in the appended claims.

The accompanying drawings illustrating the invention are as follows:

Figure 1 is a side view of the duster.

Fig. 2 is a side view of the dust container and the adjacent portions of the pump cylinder and discharge tube attached thereto, parts being broken away to show details of construction.

Fig. 3 is an end view of the container.

Figure 13:
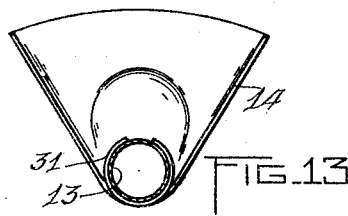

And, Fig. 13 is a sectional view on line 13—13, Fig. 1.

In the drawings similar reference numerals refer to similar parts throughout the several views.

The numeral 1 represents a pump cylinder having a closure 2 at its outer end through which is a central aperture for slidably receiving a reciprocating rod 3 provided with a handle 4 at its outer end and a piston 5 at its inner end. This cylinder 1 extends through and is both secured to and supported by the flanged end 6 of a screw cap 7 adapted to be threaded on the exteriorly threaded reduced extension 8 at one end of a container indicated generally by the numeral 9. The other end of the container is also formed with a reduced threaded extension 10 on which a cap 11 is threaded, a conical member 12 being secured to the outer end face of this cap which with the end of the cap comprises a support for a discharge tube 13 on the forward end of which is a removable spreader 14.

The pump cylinder 1 extends part way into the container and at its inner end is provided with a compression chamber 15 which is formed, in this instance, by a cup-shaped member 16 inserted into the cylinder with its open face presented forwardly and, a cap or closure 17 for the member 16 having an annular wall 18 adapted to fit within that of the member 16, the cap and the bottom of the member 16 preferably being dished in opposite directions. The cap 17 is provided with an aperture surrounded by a short tubular extension 19 for receiving the open inner end of an agitator tube 20 which extends longitudinally of and practically the entire length of the container 9, the tube being arranged off-center with respect to the axis of the container and supported by the cap 17. The cup member 16 forms a seat for a valve 21 of leather or like non-metallic material, this valve acting to normally close a plurality of radial openings 22 in the bottom of the member 16, and which are formed by forcing ears 23 outwardly from the plane of such bottom portion. These ears 23 comprise means for holding a nut 24 against turning, this nut being threaded on a screw 25 the head of which, with a washer 26, clamps the valve 21 against the bottom of the cup member 16. The agitator tube 20, the outer end of which is closed, is formed, preferably, from a strip of metal in which are a longitudinally extending series of holes 27.

The discharge tube 13 is of greater diameter than the tube 20 and extends axially into the container 9, paralleling the agitator tube 20, the inner end of the tube being closed and the portion thereof within the body of the container formed with perforations 28 for the intake of air and dust.

The container 9 is made, preferably, of glass and has a true cylindrical interior surface throughout its body portion which terminates at each end in the reduced centrally arranged tubular extensions or necks 8 and 10. The exterior surface of the body portion of the container is also cylindrical throughout the greater portion of its length, the ends thereof being of hexagon shape which not only greatly reinforces the container but provide flat surfaces which prevent it from rolling, when placed upon a supporting surface, and do not obstruct clear vision through the cylindrical portion.

The operation of the duster is as follows: When the piston 5 is drawn outwardly air is admitted to the cylinder in advance of the piston in a manner well known in air pumps of this character, the valve 21 seating against the bottom of the cup member 16 and closing the openings 22. Then, as the piston is forced inwardly air pressure against the valve 21 causes it to open and admit such air through the openings 22 into the chamber 29, formed by the members 16 and 17, and from which it is conducted through the agitator tube 20 and permitted to escape through the openings 27. The laterally directed jets of air from the openings 27 effect an agitation of the dust within the container which, mixing with the air, is forced through the perforations 28 into the tube 13 and discharged from such tube to the atmosphere. Should it be desired to spread the dust as it is projected from the tube 13, a suitable spreading device 30 is provided which may be of any preferred design and includes a tubular portion 31 having telescopic engagement with the end of the member 13.

Figure 4:
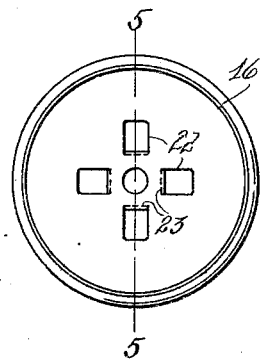
Fig 4 is an inner face view of the valve seat before the valve has been secured thereto.
Figure 5:
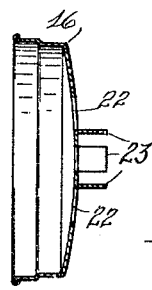
Fig. 5 is a sectional view on line 5—5, Fig. 4
Figure 6:
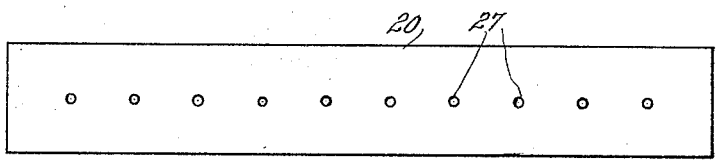
Fig. 6 shows in plan view the perforated blank from which the agitator tube is formed.
Figure 7:
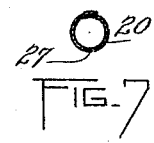
Fig. 7 is a transverse sectional view of the agitator tube.
Figure 9:
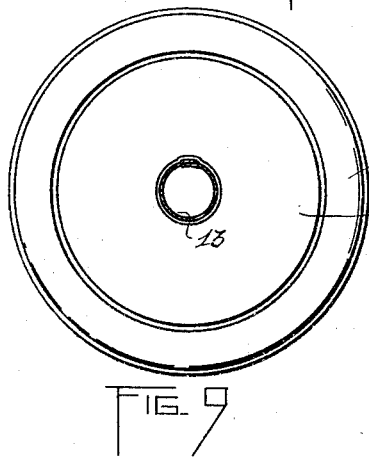
Fig 9 is a view from the left, with respect to Fig 1, of the screw cap and tube support at the discharge end of the container.
Figure 10:
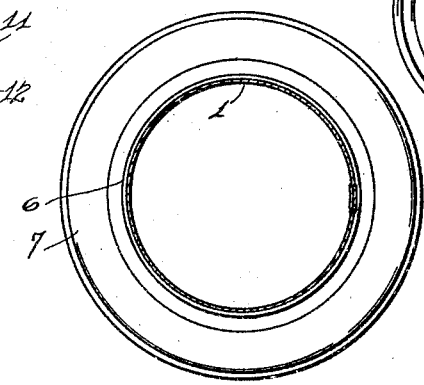
Fig. 10 is a view from the right with respect to Fig. 1, of the screw cap at the air inlet end of the container, the pump cylinder supported thereby being shown in section.
Figure 8:
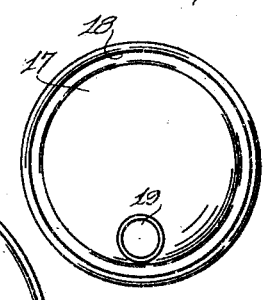
Fig. 8 is an outer face view of the air chamber cap.
Figure 11:
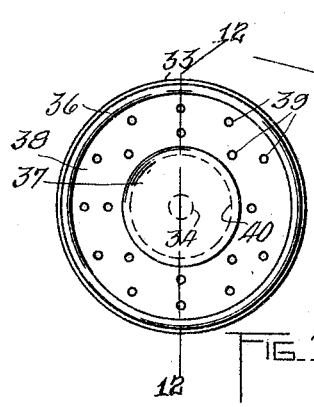
Fig. 11 is an end view from the left, with respect to Fig. 12, of a modified form of valve seat and cap member therefor.
Figure 12:
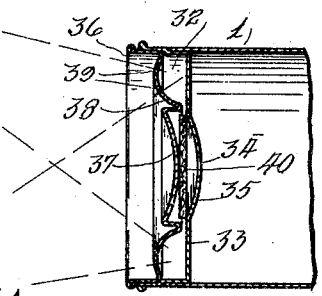
Fig. 12 is a sectional view on line 12—12, Fig. 11.

In the modification of the invention shown in Figs. 11 and 12, the compressed air chamber 32 is formed by a cup member 33 fitted to the inner end of the cylinder 1 and having an aperture 34 in a central depressed portion 35. The cap member, in this instance, has a bottom wall, the central portion 37 of which is depressed in the same direction as the corresponding portion 35 in the cup member 33 while the outer ring portion of such bottom wall is pressed in the opposite direction to provide a rounded surface 38 in which are perforations 39. These perforations being so arranged on the spherically curved surface as to project air streams from the chamber in directions at angles to the axis of the cylinder and container. With this arrangement the agitator tube 20 is dispensed with. A valve 40 is floatingly sustained between the depressed surfaces 35 and 37 and functions to normally close the inlet opening 34.

From the foregoing it will be observed that I have provided a duster in which the container is a mixing chamber interposed between a pump cylinder and a discharge tube with the three parts in axial alignment; that the container is a glass jar open at both ends and which may be filled from either end; that the jar, while of general cylindrical shape is formed with polygonal portions for reinforcement and to provide flat surfaces which prevent it from rolling when placed upon a support; that air under pressure from the pump instead of being forced directly into the container or mixing chamber is first admitted to an air chamber from which it is discharged in a plurality of streams at angles to the axis of the container, thus more effectively agitating the dust; and further, that this air chamber in which a valve is seated, is so formed as to permit ready access to the valve.

What I claim is:

1. The combination, in a duster of the character described, of a cylindrical container having two filler openings, an air pump including a cylinder attached to the container centrally thereof and extending into one of said openings, a discharge tube attached to the container centrally thereof and extending thereinto through the other of said openings, the portion of such tube within the container being perforated, a closure at the inner end of said cylinder including spaced walls forming an air chamber, one of said walls having an opening for the inlet of air under pressure from said cylinder and the other an opening for the discharge of air to the container, and a valve within the chamber for normally closing said inlet opening.

2. A compressed air duster in accordance with claim 1 characterized by said chamber having a plurality of discharge openings through which air streams are directed directly into the container at angles to the axis of said cylinder to agitate the contents thereof from a central point in the container at one end thereof.

3. The combination, in a duster of the character described, of a container including a body portion and reduced open ends, a pump including a reciprocating plunger and a cylinder, the latter extending into and secured to one of the reduced ends of the container, a discharge tube extending into the container through its other reduced end and secured to such end, a closure for the inner end of the pump cylinder forming a chamber having an inlet opening for air under pressure from the cylinder, and a valve seated within the chamber for normally closing said opening, said chamber also having a plurality of openings for the discharge of air into the container, such openings being so arranged as to direct air streams at angles to the axis of said pump cylinder to agitate the contents of said container over a large area and toward said discharge tube.

4. In an apparatus of the character described, the combination with a container, a pump cylinder and a discharge tube communicating with each other through said container, of a cup-shaped member and a removable cap therefor fitted within said cylinder at its inner end to form an air chamber, said cap having an opening for the discharge of air into the container, ears pressed from the plane of the bottom of said cup member to provide openings for the inlet of air under pressure from said cylinder, a valve within said chamber and seated to normally close said openings, and means for holding said valve in place comprising a screw extending through the valve and the bottom of said cup member and a nut threaded on said screw, the said ears engaging said nut to hold it against turning and against displacement when the screw and valve are removed.

5. In an apparatus of the character described, the combination with a container, a pump cylinder and a discharge tube communicating with the container, of a cup-shaped member and a removable cap therefor seated within said cylinder at its inner end to form an air chamber, the bottom of said cup member having an opening for the inlet of air under pressure from said cylinder, a valve within the chamber for normally closing said opening, and a tube communicating with said chamber and supported by said cap member, such tube extending into the container and having a series of perforations therein on one side thereof to direct the air from said cylinder into the contents of said container in a direction away from said discharge tube.

6. In an apparatus of the character described, a container having opposite openings, reduced exteriorly threaded extensions surrounding said openings, a screw cap threaded on one of said extensions, a pump cylinder supported by said cap and extending into the container, a screw cap threaded on the other of said extensions, a discharge tube supported by said second named cap and extending into the container, the portion of the discharge tube within the container being perforated, a compressed air chamber intermediate said cylinder and the discharge tube, a valve seated within said chmber and functioning to permit air under pressure to enter the chamber from said cylinder, and means whereby air is discharged from said chamber into the container in streams at an angle to the axis of said cylinder and said discharge tube.

7. In a device of the character described, a container open at both ends and including a body part cylindrical throughout the greater portion of its length and terminating in polygonal portions, and reduced exteriorally threaded extensions surrounding said openings, a screw cap on each of said openings, a pump cylinder supported by one of said caps, and a discharge tube supported by said other cap, both the cylinder and the discharge tube extending into the container.

8. In a device of the character described, a container affording communication and providing a mixing chamber between a pump cylinder and a discharge tube, an exteriorally threaded extension on one end of the container, a screw cap on said extension, an end wall for said cap having a central aperture, and a truncated conical member secured at its base to said end wall and having an opening aligned with said opening in the cap, said discharge tube extending through the opening in said cap and said conical member and being supported by such members.

9. In a compressed air duster, the combination of a cylindrical container having a filler opening at each end thereof in line with each other, a screw cap for closing each of the openings in said container, a discharge nozzle mounted centrally in one of said caps and extending centrally into said container, an air pump mounted in the other of said caps, an outlet nozzle carried by said pump eccentric to said cap and projecting eccentrically into said container alongside of said discharge nozzle to permit the rotation of said cap with its air pump and outlet nozzle in threading it on and off said container with the discharge nozzle in place in said container.

DEWITT TAPPAN.